United States Patent [19]

Woods

[11] Patent Number: 4,484,405
[45] Date of Patent: Nov. 27, 1984

[54] FREE FLOATING FISHING RIG

[76] Inventor: Milton D. Woods, R.R. 4, Portland, Tenn. 37148

[21] Appl. No.: 154,886

[22] Filed: May 30, 1980

[51] Int. Cl.³ ............................................. A01K 69/00
[52] U.S. Cl. ............................................. 43/4.5; 43/1
[58] Field of Search .............. 43/43.1, 4, 43.11, 43.12, 43/44.99, 4.5, 17, 17.5, 27.4, 1; D22/50

[56] References Cited
U.S. PATENT DOCUMENTS

| | | | |
|---|---|---|---|
| 2,547,308 | 4/1951 | Dean | 43/17.5 X |
| 2,738,609 | 3/1956 | Reed | 43/43.1 |
| 2,779,122 | 1/1957 | De Groff | D22/30 X |
| 2,884,734 | 5/1959 | Binkowski | 43/43.1 |
| 3,216,146 | 11/1965 | Johnson et al. | 43/43.11 |

*Primary Examiner*—Robert C. Watson
*Attorney, Agent, or Firm*—Laurence R. Brown

[57] ABSTRACT

A free floating fishing rig made of hollow plastic has a swivel rig on one edge to tilt the disc when a fish bites. It is discus shaped to permit sailing it into a desired fishing location. Stacking features are provided for carrying a plurality of the floats in a pail or the like. Also there are retrieval means for recapturing the float and water dissolvable rig holding means for holding the rig adjacent the discus when sailing into position.

8 Claims, 5 Drawing Figures

U.S. Patent     Nov. 27, 1984     4,484,405
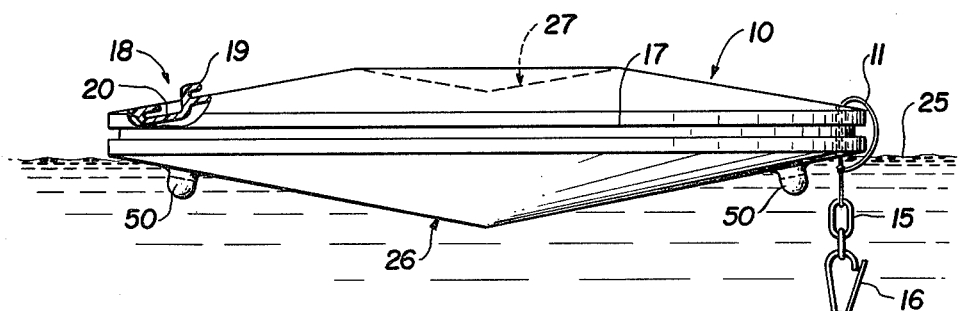
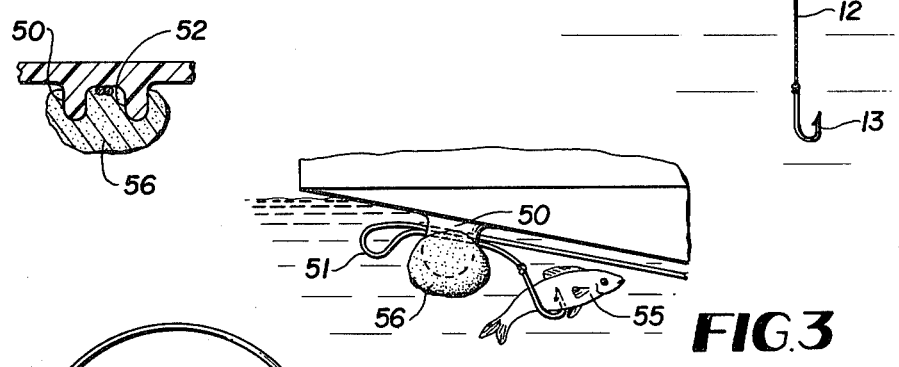
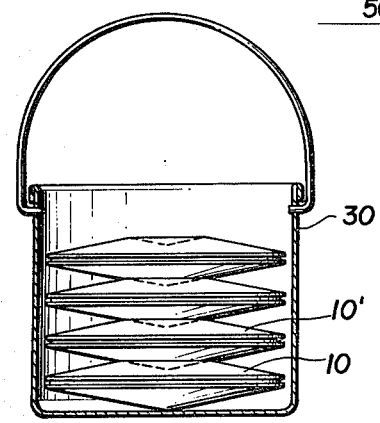
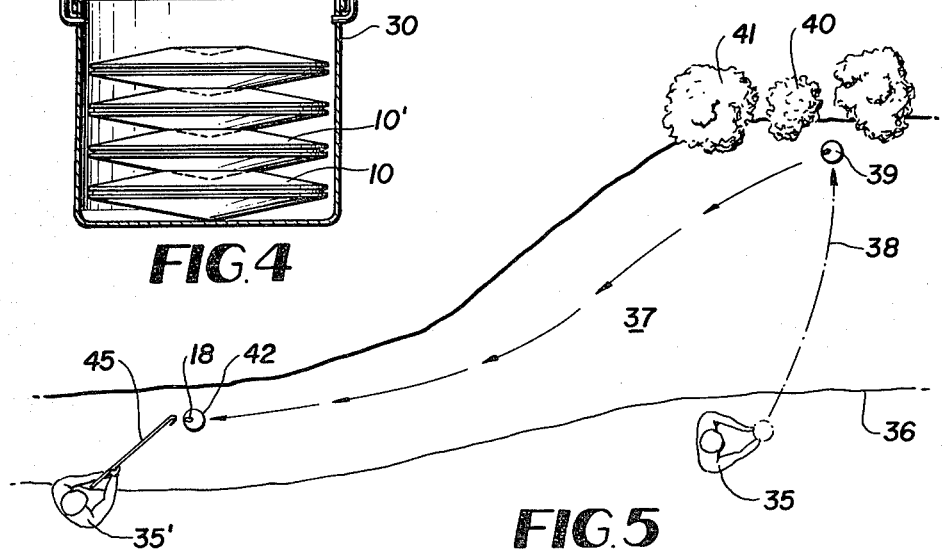

FREE FLOATING FISHING RIG

TECHNICAL FIELD

This invention relates to fishing rigs and more particularly it relates to free floating fishing rigs not attached to a retrieval line.

BACKGROUND ART

The art of free float fishing is known as shown for example in W. V. Johnson et al.-U.S. Pat. No. 3,216,146 issued Nov. 9, 1965. Thus, a rig is attached to a float and allowed to drift without restriction by a retrieval line.

However, a fisherman has not been able with prior art free floating rigs to easily throw the rig considerable distances with accuracy into a desired fishing site.

Also, retrieval of prior art free floating rigs has been a problem, not only because of difficulty in finding small round floats, but because they may also be submerged by large fish or are likely to get caught in brush or snags of various sorts.

It is pertinent to keep the line from being snarled or snagged particularly when fishing near a bank under brush or the like or when attempting to throw a rig into a desired location.

Also it is pertinent if throwing a rig to keep backlash and snap out of the action since it will dislodge delicate bait such as a minnow.

Accordingly, it is an object of this invention to provide improved free floating fishing rigs.

DISCLOSURE OF THE INVENTION

Therefore, there is provided by this invention a free floating fishing rig in the form of a hollow plastic discus shaped float with rig attached to one edge thereof. The discus is for example 10 inches (25.4 cm) in diameter and thus can be spun or sailed accurately into a desired fishing position at a location far away from the fisherman. Further it can be manipulated in such a way to boomerang into position behind a brush clump, for example.

A fisherman on a bank can sail the discus shaped free floating rig into position in a stream to float down near a bank under brush to a downstream retrieval position. In fishing a stream, the float can be released and watched to locate the position of fish. Because of the tilt action float with the line attached to one side of the discus, it signals a fish bite sensitively even with a large float, and yet is so large a fish is not apt to drag the rig down and entangle it in underwater brush.

The line is stored by wrapping around a groove in the float and thus is ready for immediate use. Also a concave-convex shape assures better tilting with a bite, and limited storage space for a stack of floats, which are readily carried for example in a plastic bucket.

There are retrieval means provided for hooking the float with a rod. Also there is rig holding means for storing a baited rig when sailing it discus style to prevent any snap action or flinging line which can extend into brush.

A swivel snap arrangement on the edge of the discus makes it feasible to use any desired line, hook or rig and to quick change from one to another.

The discus shape also is pertinent in giving live bait action in the presence of small waves and ripples, since the unstable discus will wiggle and tilt at the edge and keep the bait moving.

Other features, advantages and characteristics are set forth throughout the remaining description, drawings and claims.

BRIEF DESCRIPTION OF THE DRAWINGS

In the drawing:

FIG. 1 is an elevation view, partly cut away in section of a discus shaped free floating fishing rig afforded by this invention;

FIG. 2 is an enlarged fragmental sectioned view of a line storage feature, enhancing the discus like sailing action to locate the rig in a particular fishing location;

FIG. 3 is an enlarged fragmental view, partly in section of the line storage member in use with the discus like float member;

FIG. 4 is an elevation, section view sketch showing the storage and balance feature attained by shaping the discus with concave and convex opposed surfaces; and FIG. 5 is a sketch or a portion of a stream illustrating the manner of locating the free float rig and retrieving it for stream fishing.

DESCRIPTION OF THE PREFERRED EMBODIMENT

As may be seen from FIG. 1, this invention provides a fishing float 10 in the form of a hollow plastic discus shaped body, which has a rig fitting 11 on one edge. A fishing line 12 and hook 13 dangles in the water 14 from a swivel jointed 15 clasp 16 which permits quick change of line, hook and if desired lure assembly.

Preferably for storage purposes, the line 12 is just long enough to fit the circumference of the float 10 and thus to rest in groove 17 for storage with the hook 13 secured in rig 11 but can be shorter or longer whenever it is desired to have the bait at different levels. Typically the float 10 has a diameter of about ten inches (twenty-five cm).

Since the float 10 is free floating without an attached line, a retrieval member 18 is provided with hook 19 and indentation 20 shaped to receive the end mating hook-like member of a rod. This permits retrieval from shore by a fisherman. Of course, if the float is used in a lake, it can be retrieved from a boat.

Note that by attaching the rig fitting 11, near the edge of the discus shaped float body 10, that several advantages are achieved. Firstly, a bit is easily observed even though the float dimensions are large, because the float tilts about its center of gravity. Also the small waves or ripples 25 on the water surface together with the lower surface convex shape 26 will cause a tilting action keeping the bait on hook 13 in action rather than dead in the water as would occur for example if the bait were hung from the center apex of the bottom float surface. Furthermore this provides together with rig fitting 11 and indented groove 17 a ready storage feature for the hook 13 and line 12 when the float is not in use.

The upper surface 27 of the float body is conversely convex. This not only changes the center of gravity aiding the tilting action aforesaid, but also permits the floats to be more compactly stacked as illustrated in FIG. 4, for example. Thus floats 10, 10' may be stacked and carried easily in bucket 30, by resting the convex-concave surfaces.

The use of a free floating rig as provided by this invention is significantly enhanced by the flat discus shape. Thus, as seen for example in FIG. 5, a fisherman 35 can stand on one bank 36 of a stream 37 and sail the float discus style across the stream along a pathway 38 to reach a specific fishing location 39 which would permit the float to pass below bushes 40, 41, etc. in its flow to downstream recovery location 42. This then can test the location of fish in the stream and give access to locations not reachable by conventional fish pole and line tactics. The aerodynamic qualities of a discus shaped object are well known so that it is to be recognized that this item can be used in a new sport skill fishing method analagous to fly-fishing for locating an exact fishing spot.

When the float comes to downstream location 42 the fisherman 35' may then retrieve the free floating rig assembly with hooked rod 45 by engagement with the retrieval means 18 shown in FIG. 1. The outer surface of the float is painted a bright phosphorescent color such as orange so that it can easily be seen coming down stream 32.

In order to enhance the discus type action of this invention, the underside of the float is provided with line holding grooved tabs 50, 51 (FIGS. 1, 2 and 3). As seen in FIGS. 2 and 3 the line 12 may be looped 51 and fitted into the grooves 52 of the tabs 50 to hold it close to the underside of the float body 10 and within the float peripheral dimensions. This prevents the flinging of line 12 and hook 13 as the discus shaped float is sailed which might possibly catch in brush or snap off the fragile bait such as minnow 55.

The line is easily held in place for sailing with a wad 56 of water soluble dough ball or the like, which melts off almost instantaneously as the float hits the water and wettens the under float surface 26 about the tab 50 and the wad 56. This can serve the additional function of chumming. That is the wad will dissolve in the water and possibly attract fish to the vicinity of the float with baited hook 13.

It is clear therefore that this invention provides improved fishing equipment and method and creates a new kind of sporting skill associated with fishing, namely the sailing discus style of the fishing rig into a selected fishing location at a distance far away from the fisherman.

INDUSTRIAL APPLICATION

A free floating fishing rig can be used in a lake or stream for locating fish and catching them without requiring individual servicing of each line. They can be retrieved by boat or a rod-hook assembly when desired and when a fish is hooked.

I claim:

1. A free floating fishing rig comprising in combination, a generally flat plastic float member of discus shape without a retrieval line from the shore that can be sailed discus style into a desired fishing location off shore, said float having means for attaching a fishing hook rig on an outer edge position so that the float tilts when a fish bites and keeps the bait moving when the water ripples.

2. The rig defined in claim 1 where the plastic float comprises a hollow plastic body.

3. The rig defined in claim 1 having a retrieval member molded into the body of the float for receiving thereinto only at the time of retrieval a retrieval fitting on the end of a pole held on shore.

4. The rig defined in claim 1 wherein the discus is thicker in the center with one side having a concave surface and the other side a mating convex surface so that a plurality of the floats can be efficiently stacked for example in a carrying bucket.

5. The rig defined in claim 1 wherein the outer rim has an indented groove therearound to receive therein in a position wrapped around the float a line and hook rig for stowing in place.

6. The rig defined in claim 5 wherein the rig has attached thereto a fish line with hook of length the same as the circumference of said float and an attaching member on said rig for attaching for retaining the line in position in said groove at said outer edge position thereby holding said line and hook in stowed position.

7. A free floating fishing rig comprising in combination, a generally flat plastic float member having means for attaching a fishing rig on an outer edge position so that the float tilts when a fish bites where the float comprises a discus shaped member that can be sailed into a desired fishing location, and means for temporarily holding the rig in position adjacent said float when it is sailed into a fishing location so that it will be automatically released when the rig enters the water.

8. The method of fishing comprising the steps of rigging a free floating fishing rig without a retrieval line wherein the rig in includes a flat discus shaped fishing float assembly having aerodynamic sailing qualities with a short piece of line and a hook attached to the edge thereof so that the float tilts when a fish bites, and sailing the discus float assembly discus style into a desired fishing location.

* * * * *